United States Patent [19]

Deschaine et al.

[11] Patent Number: 4,771,420
[45] Date of Patent: Sep. 13, 1988

[54] TIME SLOT INTERCHANGE DIGITAL SWITCHED MATRIX

[75] Inventors: Stephen A. Deschaine, Garland; Michael K. Corry, Dallas, both of Tex.

[73] Assignee: DSC Communications Corporation, Plano, Tex.

[21] Appl. No.: 939,036

[22] Filed: Dec. 8, 1986

[51] Int. Cl.$^4$ .............................................. H04J 3/02
[52] U.S. Cl. ........................................ 370/68; 370/58
[58] Field of Search ........................ 370/68, 58, 66, 67

[56] References Cited

U.S. PATENT DOCUMENTS

| | | | |
|---|---|---|---|
| 3,678,205 | 7/1972 | Cohen et al. | 370/66 |
| 4,320,501 | 3/1982 | Le Dieu et al. | 370/68 |
| 4,450,557 | 5/1984 | Munter | 370/58 |
| 4,455,648 | 6/1984 | Binz et al. | 370/66 |
| 4,470,139 | 9/1984 | Munter | 370/66 |

Primary Examiner—Douglas W. Olms
Assistant Examiner—Melvin Marcelo
Attorney, Agent, or Firm—Jerry W. Mills

[57] ABSTRACT

A time slot interchange matrix is comprised of a plurality of matrix modules (50)–(56) each for receiving data on a plurality of channels and transmitting data on the same number of channels. Each of the modules consists of separate banks of random access memory that are interfaced with an intramatrix bus (70) for receiving data from each of the matrix modules in the system for storage therein during a collection frame. During a transmission frame, this information is randomly accessed in accordance with an interconnect pattern stored in a control RAM (122) for output from the digital matrix module. Each digital matrix module stores all of the information in the system such that the system is non-blocking for any given channel stored and such that information is not impeded by the interconnect pattern of another digital matrix module.

18 Claims, 5 Drawing Sheets

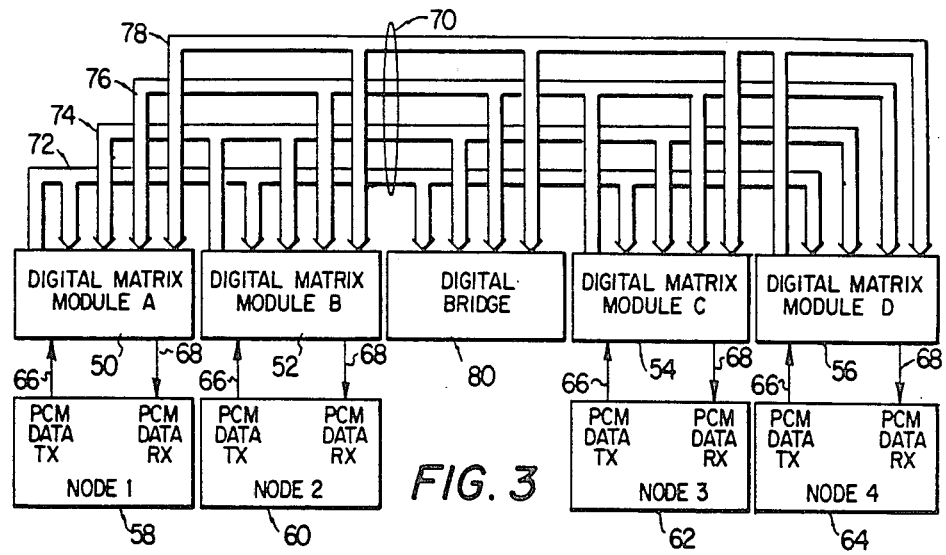
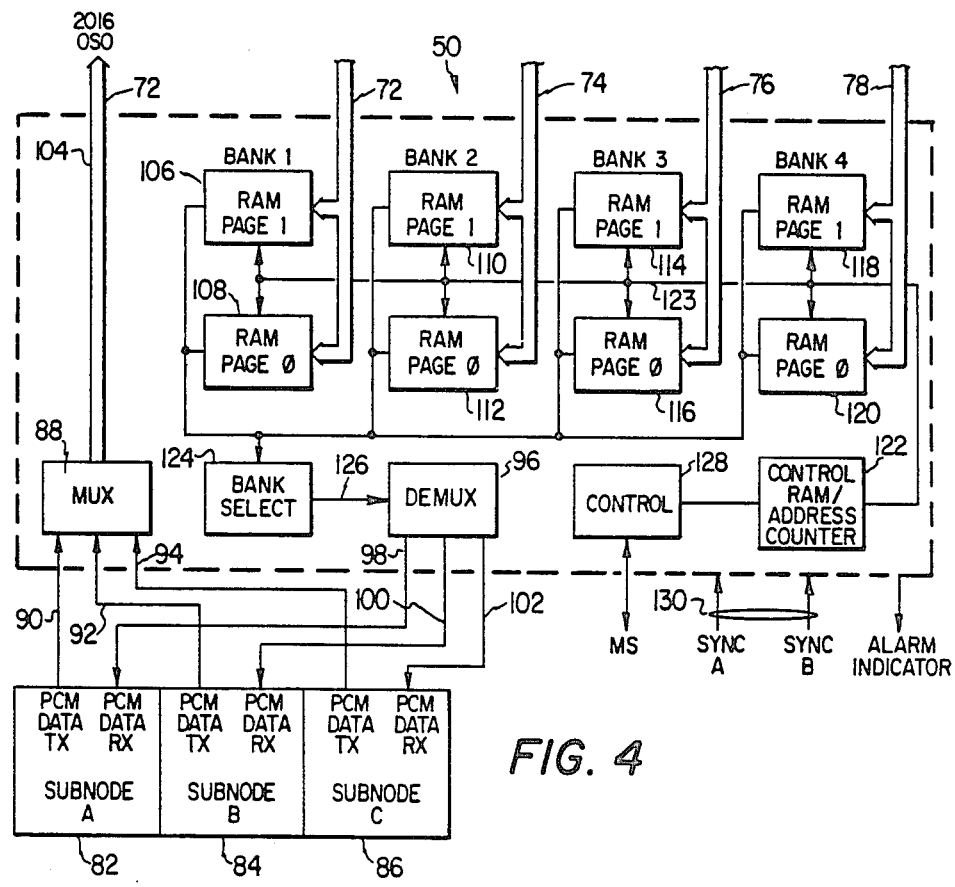

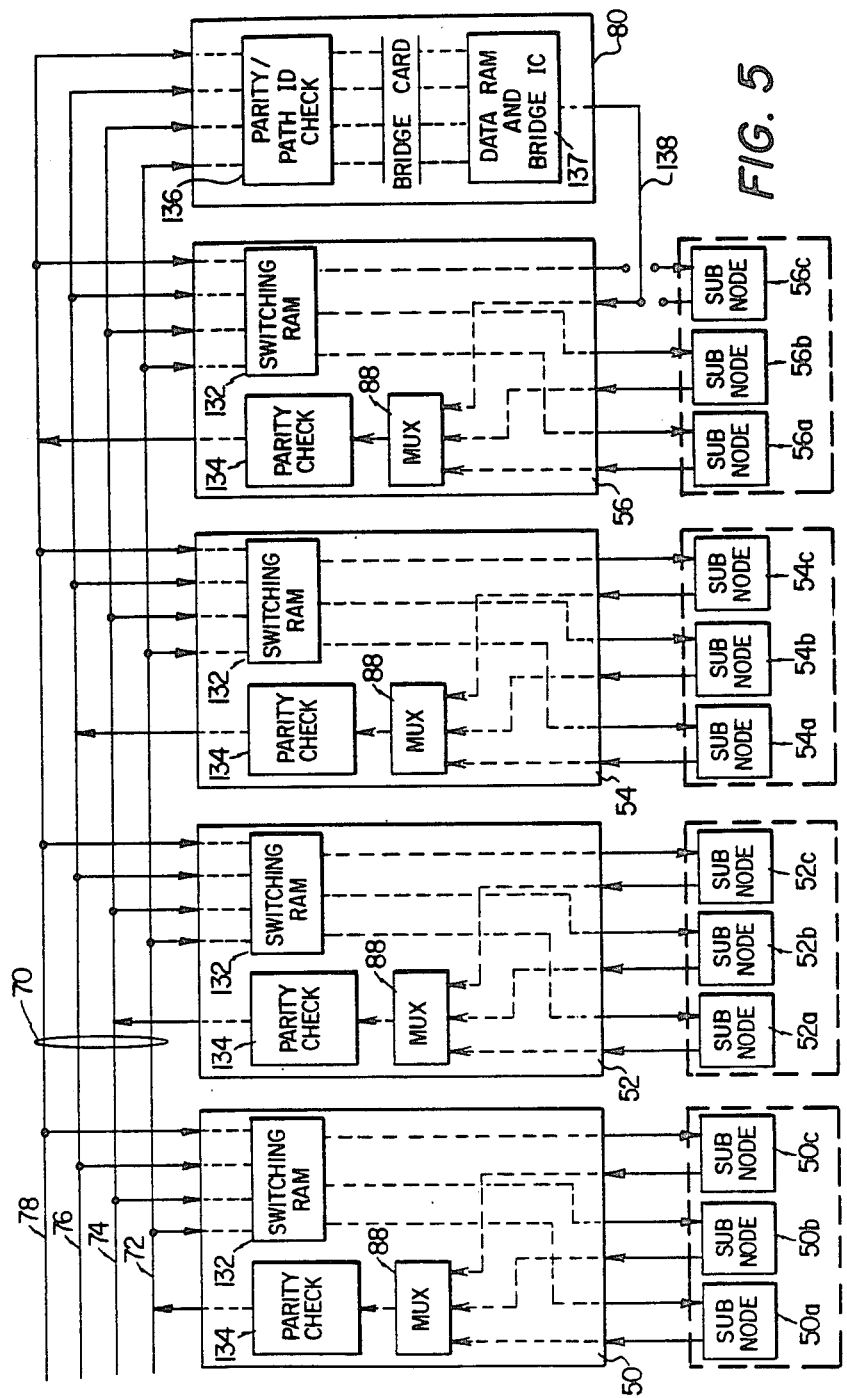

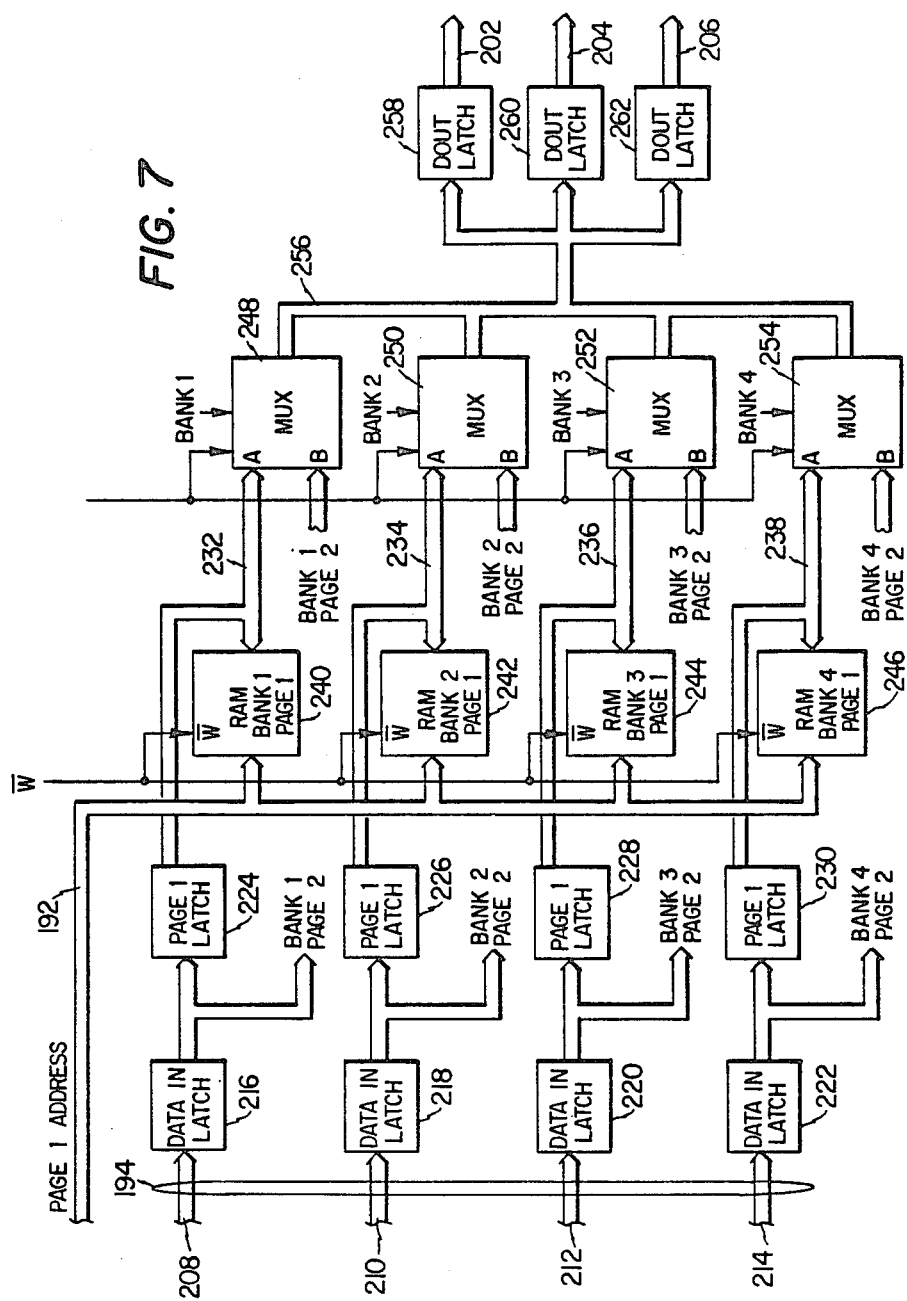

TIME SLOT INTERCHANGE DIGITAL SWITCHED MATRIX

TECHNICAL FIELD OF THE INVENTION

The present invention pertains in general to telephone switching matrices and, more particularly, to a switch matrix of the time slot interchange type.

BACKGROUND OF THE INVENTION

The telephone switching matrix can be of two (2) forms, a time matrix or a space matrix. A space matrix is essentially a hardwired connection whereas a time matrix involves some minimal time delay in order to provide the switching. One form of a time matrix is a time slot interchange (TSI) which collects data in a given transmission frame, stores the data and then outputs the data in a subsequent frame. During the subsequent frame, the data is output in a different sequence than when it was received. A description of a TSI switch can be found in U.S. Pat. No. 4,112,258, issued to H. G. Alles.

In most telephone transmission protocols, the information is divided into a plurality of time domain multiplexed channels such that a predetermined number of channels exists in a given sample frame. Each channel consists of one sample of a linear value that is digitized and transmitted in a given time slot in the time frame. The preferential way of transmitting digital information is by pulse-code modulation (PCM).

A demultiplexer is typically disposed at the receiving end in the transmission system for receiving the digitized data stream and routing this information to a particular location which is a function of the time position in a particular frame. For example, if a frame were comprised of twenty-four channels the PCM information in the first channel would be routed to a first location and the information in the second channel would be routed to a second location, the remaining channels being routed to a different location also. This continues for each frame with a first location receiving the information stored in the first channel of each frame, each channel distinguished by its time slot or position in the frame. It is necessary that the first time slot in each frame receive information for only one channel in each successive frame. This is normally a straightforward task when a system is synchronized with respect to frames. However, if information is to be switched in anything other than a T1 format, there is a potential that the integrity of the channels can be altered.

In a conventional TSI system, information is received and sequentially stored in a random access memory (RAM) in a given frame. In the next successive frame, this information is randomly output to a different channel in a different time slot. For example, if information in channel 1 of a collection frame is received from position A and this information is to be transmitted to a position B which corresponds to the second channel in the transmission frame, it would be necessary to access the stored information in the RAM in a different sequence than it was stored such that information received in the first channel during collection is transmitted in the second channel during transmission. This therefore requires a sequential writing of data to the RAM and random reading of the data in accordance with a predetermined connection pattern. Of course, the information is delayed by a single frame.

One of the disadvantages to a TSI system is that present day RAMs have a finite access time and capacity for writing of data to or reading of data from the RAM. Since the length of time for a given frame is defined by the T1 protocol, this provides a limitation for the amount of data that can be written to the RAM in a given frame and read from the RAM in a given frame. If the data to be switched exceeds this, it is then necessary to cascade a number of time matrices. This would be accomplished by interconnecting two time matrices with a space matrix which would result in a time-space-time matrix. This of course requires an additional frame of delay to go through the cascaded time matrix. This is a disadvantage from the time delay standpoint and also from the difficulties involved in interfacing the various matrices. These difficulties arise from the software involved in handling the switching configuration and also in the actual interconnection hardware.

The present invention overcomes the disadvantages of expanding a time matrix beyond the capabilities of the state-of-the-art access time for volatile memories to allow expansion of the system regardless of the access time of the memories.

SUMMARY OF THE INVENTION

The present invention disclosed and claimed herein comprises a switch for interconnecting digital call signals with different communication call paths between random electrical switch ports corresponding to the path. The switch includes a plurality of nodes, one of the nodes associated with each of the switch ports. The digital call signals are received at each of the nodes from the associated switch ports in a collection time frame at a predetermined time rate. Storage capacity is provided at each of the nodes for storing all the digital call signals received from each of the nodes in the switch during the collection time frame. A predetermined storage pattern and a predetermined interconnect pattern are stored at each of the nodes. The received digital call signals are stored in accordance with the predetermined storage pattern and digital call signals are accessed in accordance with a predetermined interconnect pattern, the accessed digital call signals accessed during a transmission time frame. Interface buses are provided for interfacing received digital call signals from each of the nodes with the storage circuitry on each of the nodes. This allows the storage circuitry at each of the nodes to contain all the information in the switch from all the nodes in the switch. Control circuitry is provided for storing in each of the storage circuits received information in accordance with a predetermined storage pattern. The control circuitry also accesses the stored information in accordance with the predetermined interconnect pattern. The stored pattern is a sequential pattern that stores the received digital call signals in the order in which they were received and the interconnect pattern is a random access pattern which defines the interconnect call paths.

In another embodiment of the present invention, each of the memory circuits is comprised of a plurality of memory banks at each of the nodes. Each of the memory banks is associated with only one node in the system such that each node has a separate memory bank for each of the nodes in the system including the associated node. The interface bus interfaces between each of the memory banks and each of the associated nodes in the system such that received digital call signals from one of the nodes in the system is stored in a separate memory bank in each of the nodes in the system. When accessing information, only one of the memory banks is selected and the selected stored digital call signal accessed therefrom in accordance with the predetermined interconnect pattern.

In yet another embodiment of the present invention, each of the memory banks is comprised of two separate random access memories. One of the random access memories is operated in a read mode while the other is operated in a write mode during a given collection/transmission time frame. On a successive collection/transmission time frame, the memories are alternated such that the memory previously in the read mode operates in the write mode on a successive collection/transmission time frame and the memory previously operated in the write mode now operates in the read mode. This results in a delay of one collection/transmission time frame.

BRIEF DESCRIPTION OF THE DRAWINGS

For a more complete understanding of the present invention and the advantages thereof, reference is now made to the following description taken in conjunction with the accompanying Drawings in which:

FIG. 3 illustrates a block diagram of the system of the preferred embodiment;

FIG. 4 illustrates a schematic block diagram of one of the digital matrix modules in the system of FIG. 3;

FIG. 5 shows a detailed schematic block diagram of the system of FIG. 3;

FIG. 7 illustrates a schematic block diagram of the memory block for page one of the memory.

DETAILED DESCRIPTION OF THE INVENTION

System Overview

Figure 1:
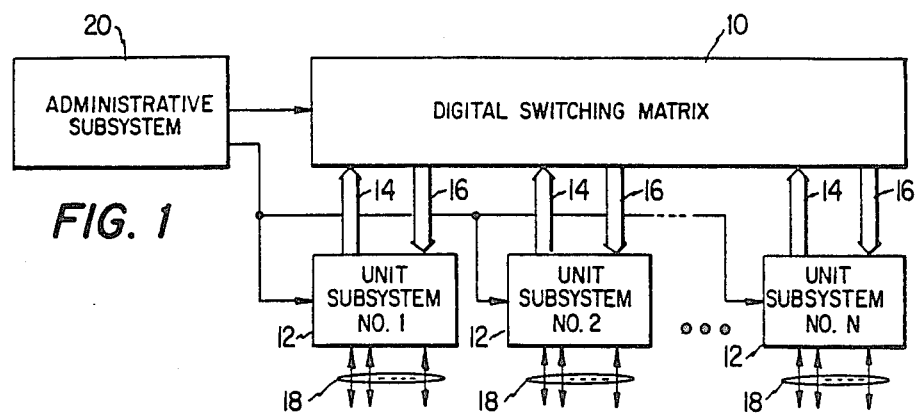
FIG. 1 illustrates a schematic block diagram of a general digital/cross-connect system.

Referring now to FIG. 1, there is illustrated a schematic block diagram of a general digital cross-connect system. The cross-connect system is comprised of a digital switching matrix 10 which is interfaced with individual unit sub-systems 12 labeled "1" through "N", the interface being an ingoing bus 14 and an outgoing bus 16 for transfer of digital information therebetween. Each of the unit sub-systems 12 is interfaced with DSO channels 18 on each unit sub-system, each sub-system 12 having a plurality of DSO channels associated therewith.

The unit sub-systems 12 are operable to receive pulse-code modulation (PCM) information from the DSO channels and arrange this information in a channel type format where the processing is performed by the digital switching matrix 10. This arrangement will be described in more detail hereinbelow; however, this arrangement is conventional. The information is then transmitted to the digital switching matrix 10 for storage therein and retransmission to another one of the DSO channels 18 in the cross-connect matrix. The overall operation of this system is controlled by an administrative sub-system 20.

Digital transmission over a voice-grade line is accomplished with a T1 carrier system. In digitizing an analog signal for transmission along this type of carrier system, the signal is first sampled, quantitized and then encoded. The sampling rate is around 8 kHz which results in one sample every one hundred twenty-five microseconds. Analog information sampling is then encoded using pulse-code modulation (PCM) techniques, which is a common digitizing technique in use today. Utilizing the maximum capacity of a transmission system, 24 voice channels are transmitted together with time division multiplex (TDM) techniques. The T1 carrier system provides the multiplexing by sampling the 24 channels at a combined rate of 192,000 times per seconds (8,000 times per second per channel×24 channels=192,000). In each frame, there are 24 separate time slots with each slot being occupied by 8 bits, each 8 bit segment representing a PCM word representing an analog value for that particular sample of that particular channel. The frame therefore contains one sample for each channel plus an additional bit for frame synchronization. Thus, the complete frame is 193 bits (8 bits per channel×24 channels+1 sync bit=193). Since the frame represents only one of the required 8,000 samples per second, a T1 system operates at 1.544 megabits per second to accommodate all 8,000 frames (193 per frame×8,000 frame=1.544 M). Each sample in the frame has a TDM slot of 5.2 microseconds.

Conventional digital hierarchy provides five levels of digital data rates that can be combined to form various channel banks and multiplexers. These levels are referred to as the "T" carriers with T1 carrier having a transmission rate of 1.54 MBit/second with 24 PCM voice channels, the T1C carrier having a transmission rate of 3.152 MBit/S providing 48 PCM voice channels, the T2 carrier having a transmission rate of 6.312 MBit/S providing 96 PCM voice channels, the T3 carrier having a transmission rate of 44.736 MBit/S providing 672 PCM voice channels and the T4M carrier having a transmission rate of 274.176 1 MBit/S and providing 430 PCM voice channels. For the purposes of the present application, only T1 transmission will be discussed. However, it should be understood that any type of transmission can be facilitated in the present invention.

Digital Matrix

Figure 2:
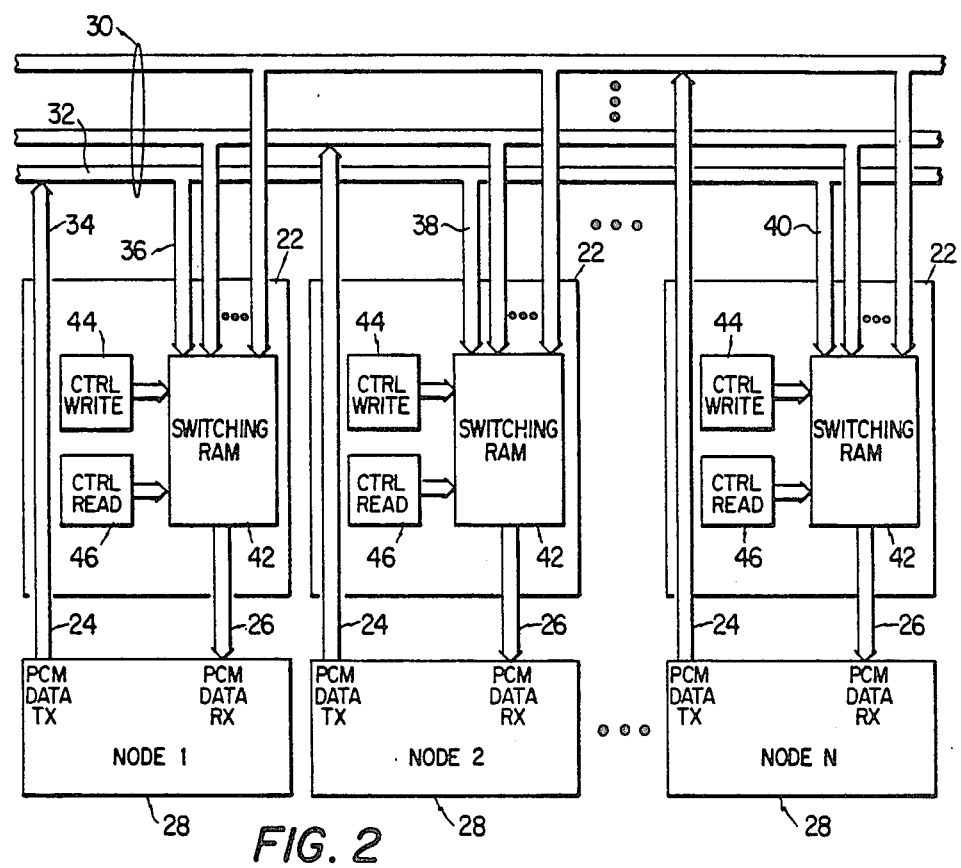
FIG. 2 illustrates a block schematic block diagram of a digital matrix utilizing the present invention in a time slot interchange format.

Referring now to FIG. 2, there is illustrated a schematic block diagram of a digital matrix utilizing the present invention in a time slot interchange format. The system is made up of a plurality of digital matrix modules 22, each module having an input data bus 24 for receiving PCM input data and an output data bus 26 for outputting PCM data. Each of the input data buses 24 and 26 are interfaced with nodes 28 labeled "1" through "N". Each of the nodes is operable to receive information from a plurality of channels in accordance with the carrier transmission format (i.e. T1 transmission) and interface this data with the digital matrix module. This is a conventional format for time slot interchange.

Each of the digital matrix modules 22 has a predetermined capacity for receiving data on the input bus 24 and outputting data on the output bus 26. This information is input to the system for storage therein and switched information is then transmitted back to one of the nodes 28 through the associated one of the output buses 26. It is the rate of retrieval of information from storage and the time constraints of the transmission format that determines the capacity of the system, since only a finite amount of information can be input to the system for storage and retrieval. This cannot easily be cured by increasing memory because all of the information in a given collection frame must be accessible for output in any given time slot of a transmission frame to provide a non-blocking system.

In the present system, the T1 transmission format is utilized which provides for 24 channels. The 24 channels are sampled with a sampling rate 8 kHz. Therefore, each frame is 125 microseconds in duration with each frame operating with a time domain multiplex (TDM) time slot of 5.2 microseconds. The TDM time slots for the 24 channels hereinafter will be referred to as TDM time slots, $t_1$–$t_{24}$.

Once the system is synchronized with respect to the beginning and the end of a given frame, it is only necessary to ensure that information in a common time slot for successive frames from a given node 28 is placed onto the bus 24 in a predetermined order. In a like manner, during the same 5.2 microseconds duration for a given TDM time slot, information in that particular TDM time slot is output on output bus 26. If the digital matrix module required 5.2 microseconds to access a PCM word and output it, this would mean that during any given frame on 24 channels, information could be input to module 22 or output therefrom. As will be described hereinbelow, this is determined by the parameters of the storage device. If the storage device could access information 28 times in a given TDM time slot, this would mean that 28 separate channels could be stored in each of the TDM time slots $t_1$–$t_{24}$.

For example, if the internal memory of an individual module were capable of accessing PCM information in a given channel 28 times in a given TDM time slot, each of the 24 TDM time slots, $t_1$–$t_{24}$, would provide the capability of holding or allowing storage of 28 channels of information. This would result in a total of 672 channels. The nodes 28 determine how this information is input to the digital matrix module 22 with respect to the frame. The information would be arranged in 28 "shelves", each shelf having 24 channels corresponding to the TDM time slots $t_1$–$t_{24}$. In the first TDM time slot $t_1$, the information corresponding to that time slot would be sequentially input to the bus 24 from each of the shelves such that 28 channels of information would be stored in the system during a given time slot and, in a similar manner, 28 channels of information would be output on bus 26 during the same time slot. In the next sequential TDM time slot, the next 28 channels are sequentially input from each of the shelves. Each TDM time slot requires that this transfer of the information from each of the 28 shelves be accomplished in 5.2 microseconds. Capacity can be expanded, of course, if more channels of information can be stored and accessed within the 5.2 micoseconds. Therefore, the capacity of the system is determined by the length of the data word that must be input to or output from matrix module 22, the stored access time for reading or writing data and the duration of the TDM time slot.

Referring further to FIG. 2, each of the input buses 24 passes directly through the module and is connected to an intramatrix bus 30 which is a group of data buses, with one data bus in the intramatrix data bus 30 operable to receive data from only one of the digital matrix modules 22, but operable to output data to each of the digital matrix modules 22. For example, a data bus 32 in the intramatrix bus 30 is interfaced with bus 24 in the digital matrix module 22 associated with node #1 through a connecting bus 34. The data bus 32 is interfaced with the digital matrix module 22 associated with node #1 through an output bus 36, with the digital matrix module 22 associated with node #2 through an output bus 38 and with digital matrix module 22 associated with node #N through an output bus 40.

When information is transmitted to the system from node #1, information flows through the associated input bus 24 to connecting bus 34 for transmission to all of the digital matrix modules 22 associated with all of the nodes 28 in the system including the first node 28. In a similar manner, any information from any of the remaining nodes is transmitted to each of the digital matrix modules 22 in the system, resulting in all the information transmitted from the nodes 28 being stored in each of the digital matrix modules 22. When data is transferred from the digital matrix module 22 to the associated one of nodes 28, it is only necessary to fetch the desired information from internal storage in the associated digital matrix module 22. This results in a non-blocking system which does not require two levels of switching wherein information would be transmitted from another storage area in another digital matrix module across a common interconnecting bus to the digital matrix module associated with the respective node.

It is important to note that on retrieval of information from the system illustrated in FIG. 2 that information is written into each of the digital matrix modules 22 at n times the rate that it is written out. For a system with n nodes, n data words are input to the system at any given time with one data word output at each node for each data word input thereto. However, there are n−1 more data words input to each of the digital switch matrix modules associated with each of the nodes than can be output therefrom. The purpose of this is to allow access to every data word input to the system to provide a non-blocking system. If n data words were not stored locally at the nodes, some contention might arise when two nodes attached to separate digital matrix modules were accessing the same information in a given output time. The system of the present invention prevents this contention by writing all of this information in RAM in parallel at the same rate the data is output from a given node.

Each of the digital matrix modules 22 has a switching RAM 42 associated therewith that has the input thereof interfaced with the intramatrix bus 30 for receiving information therefrom for a Write operation and the output thereof interfaced with the output bus 26 for a Read operation. A control Write circuit 44 and a control Read circuit 46 is associated with each switching RAM 42 to control the Read and Write operation. Each of the switching RAMs 42 are comprised of parallel RAMs, each RAM associated with one of the data buses in the intramatrix data bus 30. This allows each of the RAMs in the switching RAM 42 to store only information received from one of the nodes. Therefore, there are N individual RAMs in each of the switching RAMs. The switching RAM 42 is operable to switch between the individual RAMs to select the data for output to the associated node.

For example, if information from node #N were to be transferred or switched to node #1, this information would be stored in the Nth RAM in switching RAM 42 associated with node #1 and this RAM would be interfaced with output bus 26. It is important to note that this switching takes place internally to the one of the digital matrix modules 22 associated with node #1 and did not require any access to information stored in the digital matrix module 22 associated with node #N.

When writing to the RAMs, information is sequentially input to the RAM such that it is arranged in a predetermined order during a "collection" frame. This results in all the information in all the channels of the system being stored in switching RAM 42. In the transmission frame, the control Read circuit 46 is operable to store a connection pattern that allows information from any channel to be transmitted to the appropriate location. However, it may be necessary to change the TDM time slot (i.e., time slot interchange) to which this information is transmitted as the receiving location may be associated with a different time slot compared to the time slot of the information when it was collected. Of course, the transmitted information may be associated with the same time slot as when it was received in a collection frame, in which case no time slot interchange is required. However, this makes no difference, since all of the information is available in the switching RAM 42 from the previous collection frame for output on bus 26 during any TDM time slot in the transmission frame. Therefore, any channel information in the system that was stored in the collection frame is available for output to any given node from its associated switching RAM 42. The capacity of a given node 28, as described hereinabove, is determined by the number of parallel bits that are transmitted along output data bus 26 and the rate at which this data can be accessed from memory.

Cross Connect Switch with Bridge

Referring now to FIG. 3, there is illustrated a block diagram of the system of the preferred embodiment. The system utilizes four digital matrix modules 50, 52, 54 and 56 labeled "A" through "D". Each of the digital matrix modules 50–56 are interfaced with nodes 58, 60, 62 and 64, respectively, each of the nodes 58–64 labeled "node #1–node #4", through PCM data buses 66 for inputting data to the associated module 50–56 and PCM data bus 68 for output of data from the associated one of the digital matrix modules 50–56. Each of the digital matrix modules 50–56 are interfaced together through an intramatrix bus 70. The intramatrix bus 70 is comprised of four separate buses 72, 74, 76 and 78. Intramatrix bus 72 is operable to transmit PCM data received from node 58 through digital matrix module 50 and disperse it to the internal switching RAM (not shown) of all of the modules. In a similar manner, bus 74 is operable to receive data from node 60 through digital matrix module 52 for dispersal to all of the digital matrix modules 50–56, bus 76 is operable to receive data from node 62 for dispersal to all of the digital matrix modules 50–56 and bus 78 is operable to received data from node 64 through digital matrix module 56 for dispersal to all of the digital matrix modules 50–56. In addition, all of the intramatrix buses 72–78 are input to a digital bridge 80, the operation of which will be described hereinbelow.

The system of FIG. 3 operates similar to the system of FIG. 2. That is, each of the digital matrix modules 50–56 receive data from the associated node and transmit it to all the modules including the module from which it originated for storage therein. Therefore, each of the digital matrix modules 50–56 have stored therein all of the information transmitted to the system from any of the nodes 58–64. In a like manner to that described above, extraction of data in the transmission frame is accomplished by accessing the internal switching RAM (not shown) in the associated one of the digital matrix modules 50–56 and outputting that accessed information. This is done without requiring interface with any of the digital matrix modules 50–56 in the system.

The digital bridge 80, as will be described more fully hereinbelow, is utilized in a conference or broadcast mode. In this mode, information on a number of channels is accessed from the internal switching RAM (not shown) in the digital bridge 80 and summed together for output to the other digital matrix modules 50–56 for storage therein. This allows a number of units to be combined in a single channel. Although not shown, the digital bridge 80 has one of the outputs thereof interfaced with one of the input PCM buses 66 to allow the summed data to be input back through the intramatrix bus 70 for storage in the switching RAM internal to both the digital matrix modules 50–56 and the digital bridge 80. This is done within the collection frame. During the transmission frame, this summed data is output on one of the channels and stored in the switching RAM in the digital matrix modules 50–56.

Digital Matrix Module

Referring now to FIG. 4, there is illustrated a schematic block diagram of the digital matrix module 50 in the system of FIG. 3. Module 50 is representative of modules 52–56. In the preferred embodiment, each of the nodes 58 64 (FIG. 3) output 2,016 individual channels which are received from three separate subnodes in each of the nodes 58–64, each subnode outputting 672 channels. The separate channels utilize various multiplexing techniques to sequentially input the PCM data. This is a conventional technique.

Referring further to FIG. 4, the nodes 58–64 are each represented by a subnode 82, a subnode 84 and a subnode 86, labeled "subnode A–subnode C", respectively. The subnode 82 is interfaced with one input of a multiplexer 88 through a sixteen-bit wide data bus 90, subnode 84 interfaced with multiplexer 88 through a sixteen-bit wide data bus 92, and subnode 86 interfaced with multiplexer 88 through a sixteen-bit wide data bus 94. In a similar manner, data is received from a demultiplexer 96 and interfaced to the digital matrix module through sixteen-bit wide data buses 98, 100, and 102, respectively.

Each of the subnodes 82, as described above, outputs 672 channels of information within a given collection frame and also receives information on the same number of channels during the transmission frame. These channels of information are organized such that 28 channels of information are output in each of the 24 time slots $t_1$–$t_{24}$ in a given frame. Therefore, there are 28 separate "shelves" of information with each shelf of information having 24 channels each with each channel on a given shelf occupying the time space of one time slot $t_1$–$t_{24}$. For all three subnodes 82–86, 84 channels of information are output during each of the twenty-four time slots $t_1$–$t_{24}$ to provide a total of 2,016 channels of information. All three subnodes 82–86 output three channels of information at the same time with a multiplexer 88 sequentially sequencing through data presented by data buses 90–94. Therefore, in a single time slot $t_1$–$t_{24}$, the multiplexer 88 cycles twenty-eight times with twenty-eight separate channels of data presented in a sequential manner on each of the data buses 90–94 from subnodes 82-86, respectively. In a similar manner data is output from the multiplexer 96 to subnodes 82-86.

The output of multiplexer 88 is connected to the bus 72 in the intramatrix bus 70 through an interconnecting bus 104, for output therefrom. The bus 72 is connected to the input of the switching RAM on all of the digital matrix modules 50-56. For example, the output of the digital matrix module represented in FIG. 4 is represented as being connected to bus 72 such that it is input to the digital matrix modues 50-56 on bus 72 with remaining buses 74-78 being connected to the remaining three buses in the intramatrix bus 70.

The bus 72 is input to a first bank of random access memories (RAM) comprised of a RAM 106 representing page 1 and a RAM 108 representing page 0. In a similar manner, the bus 74 is connected to a second bank of RAMs with a RAM 110 representing page 1 and a RAM 112 representing page 0. Bus 76 is input to a third bank of RAMs represented by a RAM 114 for page 1 and a RAM 116 for page 0. Bus 78 is input to a fourth bank of RAMs represented by a RAM 118 for page 1 and a RAM 120 for page 0. Each of the RAMs 106-120 are controlled by a control RAM/Address counter 122 which is interfaced with each of the RAMs 106-120 through a control line 123.

Each of the RAMs in each of the banks is interfaced with a bank select circuit 124 for selecting the output of one of the RAMs 106-120. In operation, in each bank one of the RAMs 106-120 is addressed for reading during the collection frame while the other RAM is operable to output data to the bank select circuit 124 in the transmission frame. These operations occur simultaneously. The bank select circuit 124, after selecting an appropriate output, connects one of the RAMs 106-120 to a demultiplexer 96 through a line 126. The entire system is interfaced through an MS line and control circuitry 128 to the main system to receive signals therefrom. In addition synchronization signals are provided for system timing on line 130.

In operation, the system operates in a collection mode and a transmission mode. In the collection mode, information is received from each of the subnodes 82-86 and this information is output on bus 104 to bus 72 and, subsequently, input to one of the RAMs in each of the digital matrix modules 50-56. In addition, the remaining digital matrix modules in the system output information on buses 74-78. As described above, during each time slot $t_1$-$t_{24}$, twenty-eight channels of information are collected and sequentially transmitted.

During this collection frame, one of the RAMs 106-120 in each bank for either page 1 or page 0 is designated as the RAM for storing collection information therein. This data is then sequentially stored in the designated RAM. For example, if page 0 is designated as being the RAM to which collected data is to be stored, information transmitted from bus 72 that is selected by multiplexer 88 is input through bus 72 to RAM 108 in digital matrix module 50. During an entire collection frame, 2,016 channels of information and twenty-eight channels for each of the twenty-four time slots ($t_1$-$t_{24}$) are stored in the RAM 108. Therefore, the RAM 108 must be capable of accessing and storing the information at this rate. The storage rate of RAM 108 is typically one of the limiting factors of data switching. Since the time within which information is to be stored in any storage medium is defined by the protocol of the system which in this embodiment is $t_1$ transmission system, more information can be processed by either utilizing a faster RAM or utilizing more complicated circuitry to buffer information for later storage. However, the latter requires more circuitry and may incur more delay between collection and transmission of data.

After data is collected in page 0, the control circuit 122 in a subsequent frame redesignates the collection RAM as the page 1 RAM. Therefore, all data collected in the subsequent frame and output on bus 72 is input to page 1 RAM 106. During this subsequent frame, the RAM 108 for page 0 is designated as the output RAM. If information to be output on any of the databuses 98-102 to subnodes 82-86 is contained in RAM 108, this information is output from RAM 108 to bank select circuit 124 and to demultiplexer 96. In a similar manner, all of the page 0 RAMs 112, 116 and 120 in banks 2-4 are designated as the output RAMs for transmission of data therefrom.

During the collection frame, data is arranged in the RAM in a sequential manner. This is accomplished by sequentially incrementing the column and row address in each of the RAMs designated as collection RAMs for each storage location therein. Typically, the number of storage locations will equal the maximum amount of data that can be collected and transmitted to the RAM during a given frame. For example, during the $t_1$ time slot, all twenty-eight channels of information output from subnodes 82-86 would be sequentially input to the RAM followed by the twenty-eight channels of information output during time slot $t_2$, etc. There would therefore be twenty-eight channels of information corresponding to time slot $t_1$, twenty-eight channels of information corresponding to time slot $t_2$ and so on for all twenty-four time slots, $t_1$-$t_{24}$. However, it should be understood that all of the information in the system in a given frame is sampled and stored during a given time frame at each of the digital matrix modules 50-56. It is only necessary during transmission frame that the information be received at the final destination in this time frame. Therefore, the information can be transmitted back from the system in a different one of a time slots $t_1$-$t_{24}$ as long as it is in the proper time frame.

During transmission, the control RAM/Address counter 122 has stored therein in the memory portion a connection pattern. This connection pattern is a sequence of addresses for addressing the RAMs 106-120 in a random mode that is determined by the sequence. In addition, the control circuitry of the system controls the bank select circuit 124 to output the appropriate information.

For example, if a remote point A transmits information to multiplexer 88 from the first of the twenty-eight channels of the time slots $t_1$, it occupies the first memory location in the collection RAM. A remote point B, on the other hand, may transmit information in the first of the twenty-eight channels in the second time slot $t_2$. This information would be stored in the 29th storage location in the collection RAM. Therefore, remote point A would have information stored in storage location 1 and remote point B would have information stored in storage location 29. The storage location is a function of the sequence of transmission to the multiplexer 88. This is determined by circuitry in subnodes 82-86 and the sequence of operation of multiplexer 88.

During transmission, it may be desirable to transmit information between remote points A and B. When receiving information that is output from demultiplexer 96, subnodes 82-86 operate in a similar manner to that when transmitting information to the multiplexer 88.

That is, information is presented to multiplexer 88 at a predetermined rate during each time slot. During the same period of time, information can be received by that particular channel from the mulitplexer 96.

For example, remote point A would present information to multiplexer 88 during the initial portion of time slot $t_1$. During that time, demultiplexer 96 would also output information for transmission from the system to the remote point A. Subnodes 82–86 would effect the connection between remote point A and the multiplexer 88 and demultiplexer 96 of the system of FIG. 4 during that period of time. Therefore, the control RAM/Address counter 122 must first of all select the appropriate bank and the appropriate storage location during the time in which the remote point A is receiving information from the system. In the above example, this would require the 29th location in which information from remote point B is stored to be accessed and transmitted to the appropriate one of the subnodes 82–86 that is associated with remote point A during the time that information from remote point A is being stored in the collection RAM at storage location 1. In a similar manner, the control RAM/Address counter 122 is addressing the first storage location corresponding to collection information of remote point A for transmission to remote point B during the time that collection information from remote point B is being stored in storage location 29 in the collection RAM. Therefore, information is continually being stored in a sequential manner in the collection RAM and, in a subsequent frame, the collection RAM being designated a transmission RAM and the information randomly accessed in accordance with the predetermined interconnect pattern and control RAM 122 for output in a different time slot if necessary.

In actuality, the information in a given frame in the present embodiment is stored in one of 2,016 individual time slots with the bank select circuit 124 and the control RAM/Address counter 122 providing a sequence to randomly output the information in any one of the 2,016 individual time segments during the transmission mode. This results in only one frame of delay between the collection of data on any given channel in any time slot for transmission of data back to the receiving one of remote points. As described above, all the information in this system is available in any one of the digital matrix modules. It is only necessary to store the appropriate sequence in the control RAM/Address counter 122 to associate it with the digital matrix module 50 to provide the appropriate output to the associated ones of the subnodes 82–86. Since all the information in the system is available, it is not necessary to go through an intermediate node in the system, thus resulting in a "non-blocking" system. That is, no path is ever blocked since all paths are available for access from any given one of the digital matrix modules. This is the result of distributing the information for storage locally rather than providing a central storage system which must transfer information over a switched path for output from the system Additionally, any number of digital matrix modules can be accommodated as long as each digital matrix module has a dedicated bank of RAMs associated with that particular digital matrix module for storing a given frame of information therein.

Detailed System Operation

Referring now to FIG. 5, there is illustrated a more detailed schematic block diagram of the system of FIG. 3, illustrating the multiplexer 88 in each of digital matrix modules 50–56 interconnected with three subnodes each. The subnodes are noted by the low cased references numerals a–c with the subnodes connected to digital matrix module 50 labeled 50a, 50b and 50c. The four banks of RAMs are represented in general by a box labeled "switching RAM" 132. Each of the multiplexers 88 is connected through a parity check circuit 134 for output to the associated one of the buses 72–78 in the intramatrix bus 70 with each of buses 72–78 interfaced with a switching RAM 132 in each of the digital matrix modules 50–56, as described above with reference to FIG. 4. The parity check circuits 134 are operable to check parity on the data received from the multiplexer 88 and provide an alarm signal (FIG. 4) if parity is not present.

Each of the subnodes associated with each of the digital matrix modules 50–56 are operable to output 16-bit data at a rate of 5.376 megahertz. This data is sampled at three times that rate or at a rate of 16.128 megahertz. Therefore, 16-bit data words are output to the associated one of the buses 72–78 at a rate of 16.128 megahertz. This is the rate at which this information must be switched into the switching RAM 132 in each of the modules 50–56. The capacity of the system, as described above, is limited by the rate at which a data word can be stored in the switching RAM. If, for example, the switching RAM could store data at twice the rate of that illustrated in the present embodiment, three additional subnodes could be added to a given digital matrix module, each outputting 16-bit data words at a rate of 5.376 megahertz and the multiplexer 88 operating at a rate of 32.256 megahertz. However, this is merely a design change and defines the capacity of a given digital matrix module. It is important to note that the capacity of the system is a function of the way in which data can be stored during a single frame since each bank of the RAM associated with each of the digital matrix modules has a capacity which equals or exceeds the information being input to the digital matrix module. Further, by disposing in each of the digital matrix modules an associated bank of memory for each of the digital matrix modules, it is therefore possible to have local access to all the information in the system.

For example, with the present system, information transmitted from subnode 50a is stored in each of the switching RAMs 132 and each of the digital matrix modules 50–56. If a remote point associated with subnode 54c is to receive information from subnode 50a, it is only necessary to provide a predetermined output pattern in the switching RAM 132 associated with digital matrix module 54 to effect transfer of information collected from subnode 50a and stored in switching RAM 132 in digital marix module 54 to subnode 54c. If information were not locally stored in each of the switching RAMs 132, it would therefore be necessary for a path to be provided between digital matrix module 54 and the storage location where the information from subnode 50a is stored and a time slot interchange performed. This would require a data link from the storage location to subnode 54c. If a centralized storage location were utilized, it would be necessary to provide a data link from the module 54 to the centralized storage location. It is important to note that in the present invention, no data link is required between any of the digital matrix modules 50–56 to effect transfer of information to the associated subnodes since all the information is available at each of the digital matrix modules 50-56 from all of the subnodes in the system.

Digital Bridge

The digital bridge 80 has the four intramatrix buses 72-78 input thereto and processed through a parity-/path ID check circuit 136, the output of which is input to a data RAM and bridge IC 137 for storing information and providing a summation operation. The summation operation involves selectively accessing a number of channels for summation thereof into a single channel with this channel being output from the data RAM and bridge IC on an output line 138. This line is then input to one input of the system. In the embodiment of FIG. 5 this is illustrated as the input to the input that would normally be occupied by subnode 56c with subnode 56c being disconnected from the system. Therefore, the available number of input channels for connection to remote points would be decreased by the number of input channels occupied by subnode 56c. In the preferred embodiment, this is 672 channels. The line 138 therefore represents a total, of 672 output channels such that the bridge circuit 80 can combine any number of the 8,064 channels stored in the data RAM in bridge IC 137 (2016 channels on each of the four intramatrix buses 72-78) for output on one of 672 channels.

The data RAM and bridge IC 137 of the digital bridge 80 has contained therein four banks of data RAM. Each bank of RAM can hold data from 2,016 DSO channels with one data RAM associated with each of the intramatrix buses 72-78. The bridge IC can select up to 2016 channels from storage in the digital bridge and internal bank select circuit (not shown). The received channels are summed together as directed by control information from the external system processor and control circuits. The channels can be summed into a single output and the desired configuration for up to 672 outputs. These outputs, described above, are input to one of the digital matrix modules 50-56 to allow cross-connection to the system from 1 to 672 channels. If the maximum number of channels output by the digital bridge 80 are input to one of the digital matrix modules 50-56, this results in 7392 separate channels that can be cross-connected or bridged via the digital bridge 80.

There are a number of operations that are available with the digital bridge 80. They are broadcast bridging, split-bridging and conferencing bridging. Broadcast bridging is a situation where one input channel is broadcast (distributed) to multiple output channels. The source (master station) can communicate with multiple receivers (slave stations). However, the slave stations cannot communicate with the master station or any other slave station. An example of this type of bridging is the transmission of stock market information from one location (master station) to brokerage houses, news services, and other subscribers (slave stations). The communication is one way only, from the master station to the slave stations. To effect broadcast bridging, it is only necessary to store the information from the master station into a given channel and control each of the connect patterns to interface the slave stations with that particular storage location that is occupied by the data from the master station.

In the split-bridge, multiple channels are collected (summed) to a single channel and a single channel is broadcast to multiple channels. A split-bridge provides bidirectional channels between a single master station and multiple slave stations. The master station can transmit to all slave stations and receive from any slave station. A slave station cannot communicate with another slave station on a split-bridge. An example of split-bridging service is the interconnection of automatic teller machines to a central computer. The central computer (master station) can transmit to all of the automatic teller machines (slave stations) and receive from any of them. The automatic teller machine can only communicate with the central computer.

To effect a split-bridge connection, it is necessary for the transmissions from each of the slave stations to be summed in a digital bridge 80 and then output to a single channel. This single channel is then interconnected to the receive input of the master station. In a similar manner, the master station transmission is stored in a single storage location and the associated bank in each of the digital matrix modules 50-56 and each of the slave stations linked to this storage location.

Conference bridging is where multiple channels are interconnected so that all can communicate with each other simultaneously. A conference bridge provides bidirectional channels between multiple locations. There is not a master station/slave station relationship. An example of conference bridging service is in-house tele-conferencing where various participants at different locations are interconnected to a conference bridge. Each participant can communicate with any or all other participants.

To effect a conference bridge with bidirectional communication, it is necessary to sum all of the channels in the conference in the digital bridge 80 into a single channel for storage in switching RAM 132. However, one disadvantage to conference bridging is that the transmitting station can have a feedback problem if it receives a signal comprised of the sum of all other channels and its own channel. It is desirable to cancel or significantly attenuate the receiving channel's own transmission. The digital bridge 80 is operable in the bridge IC 137 to sum all of the channels in the conference to provide a summed signal. The transmission from one of the receiving stations is then subtracted from the summed signal and output on one of the 672 channels on line 138 for storage in switching RAM 132 in all of the digital matrix modules 50-56. This chahnel is then interconnected with the station associated with the subtracted signal. For each of the stations in another conference, a similar operation is performed such that each of the stations receives a summed signal with the summed transmission subtracted or significantly attenuated. Therefore, during a transmission cycle, all of the summed information for each station in the conference is stored in switching RAM 132 in each of the digital matrix modules 50-56 with one storage channel being designated for transmission to the associated one of the conference stations. The storage location is determined by the input port to which the digital bridge 80 is interfaced. The connection pattern can then select the address with the aid of the bank select circuits for the appropriate storage location for output to the appropriate one of the conference stations.

Figure 6:
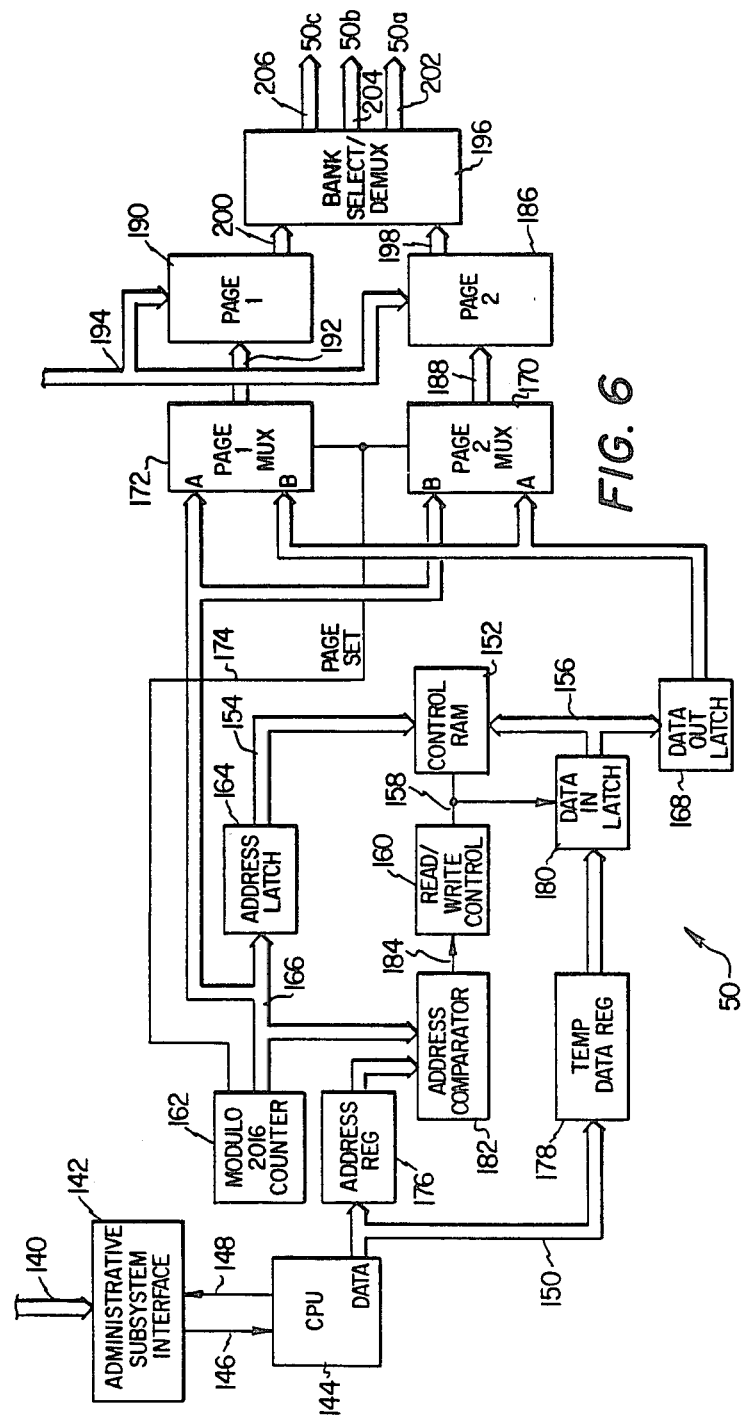
FIG. 6 illustrates a schematic block diagram of the digital matrix modules.

Referring now to FIG. 6, there is illustrated a schematic block diagram of the digital matrix modules 50-56. All reference numerals refer, for illustrative purposes, to digital matrix module 50. The digital matrix module interfaces with the administrative subsystem through a serial interface bus 140 which provides a number of control lines. One control line is a serial data line which is a 19.2 kBaud serial communication line. This serial bus is input to an administrative subsystem interface circuit 142 which provides buffering for output data to a CPU 144 on a serial line 146 and to receive data from the CPU 144 on a serial line 148. The CPU 144 is comprised of a microprocessor of the type HD6303R1P manufactured by Hitachi. This microprocessor has a serial input for receiving serial data and transmitting serial data out and converting received serial data to parallel data for transmission internally to the digital matrix module. Data is transmitted to the system on a processor data bus 150 which in one mode carries address information which is supplied by the administrative subsystem. These addresses are provided on a block basis such that each digital matrix module is supplied with a group of addresses for updating the internal memory, the internal memory utilized for storing the interconnect pattern.

At the heart of the digital matrix module is a block of control RAM 152. Control RAM 152 is comprised of four banks of control RAMs, each bank having two pages of memory. Each page of memory in each of bank is comprised of 32K of memory for storing 2016 sixteen-bit data words. Address information is received by control RAM 152 on an address bus 154 and data information is written to and read out of the control RAM 152 on a data bus 156. The location to which data is to be stored in or read from is determined by the address on address bus 154 and Read/Write control information on a control line 158 which is interfaced with a Read/-Write control circuit 160. Control RAM 152 is comprised of 32K of Dynamic RAM. The Control RAM 152 is operable to store an interconnect pattern for the digital matrix module which essentially consists of addresses for the four banks of memory for the first and second page, as will be described hereinbelow. In the preferred embodiment, the control RAM 152 is comprised of two static random access memory (SRAM) integrated circuits of the type 2018 manufactured by Toshiba Corp. Each of these devices receives an eleven-bit address word on the address bus 154, each outputting eight-bits of data to form a sixteen-bit data word. The control RAM 152 is fabricated from individual static RAMs of the type 2018 manufactured by Toshiba Corp. and receives an eleven-bit address word on the input thereof and output a eight-bit data word, each page of memory in each of the banks being comprised of two 2018 data memories.

The control RAM 152 operates in two modes, it is either written to the memory or read therefrom. The memory is operated in a synchronous manner such that the addresses on the bus 154 are stepped through in a sequential manner. The addresses are generated in a modulo 2016 counter 162 which is comprised of three 74ALS163 four-bit synchronous counters which are connected in parallel to output an eleven-bit address which is initially reset at zero and then sequentially counted up to its full range by a sixteen megahertz clock. The output of the counter 162 is input to an address latch 164 through an address bus 166, the output of address latch 164 connected to bus 154 for providing the address information to the control RAM 152. For each collection or transmission frame, the address on the input to the control RAM 152 is sequenced through one complete cycle. In the next frame, the counter 162 is reset and the count is begun over.

Data output from the control RAM 152 is placed onto bus 156 and then into a data out latch 168, the output of which is interfaced with the A-input of a multiplexer 170 for providing address information for page two of the memory and to the B-input of a multiplexer 172 for providing address information for page one of the memory. The multiplexers 170 and 172 have the remaining inputs thereof connected to the address bus 166 from the counter 162. Therefore, the multiplexers 170 and 172 are operable to receive an address from the data bus 156 or from the counter 162. As described above, the digital matrix module in the collection frame stores information in the switched RAM in a sequential manner and reads information from the switching RAM in a random mode in accordance with the interconnection pattern. This interconnection pattern is stored in the control RAM 152. A page select signal determines whether the sequential address information is output from the multiplexers 170 or 172, this signal received on a line 174 which is interfaced with the counter 162. The counter 162 is comprised in part of a programmable array logic circuit and a flip-flop to distinguish between subsequent frames for both collection and transmission. This allows page one in a first frame to be the collection frame and page two the transmission frame, and in a subsequent frame controls page one to be the transmission frame and page two to be the collection frame. This alternates for all subsequent frames.

To update the control RAM 152, it is necessary to "Write Over" information in the RAM 152 "on the fly"; that is, information is written into the RAM during the dynamic operation of the system such that data is continually output on bus 156 for storage in data out latch 168. This is facilitated by storing the address of the control RAM 152 in an address register 176, the stored address representing the location in control RAM 152 to which new address information is to be stored. This new address information is then stored in a temporary data register 178, the output of which is input to data in latch 180. The address register 176 is interfaced with an address comparator 182, address comparator 182 is also interfaced with bus 166 on the output of counter 162. Address comparator 182 is operable to compare the output of the counter 162 with the contents of address register 176 and output a signal on line 184 whenever there is a true comparison. Line 184 controls a Read/-Write control circuit 160 to latch data that was stored in the temporary data register 178 into the data in latch 180 and also place the control RAM 152 in the Write mode. The data latched into data outlatch 168 is received from the data in latch 180 and this information is also stored in the control RAM 152 at the address that was stored in address register 176. Therefore, data to be stored in the control RAM 152 is provided by the CPU 144 and output to the switched RAM memory and also stored in the control RAM during the same time. This allows updating of control RAM 152 without requiring a separate update cycle.

The output of multiplexer 170 is input to a block of memory 186 on a bus 188, which memory is comprised of page two of memory. The block of memory 190 which is interfaced with multiplexer 172 through address bus 192 comprises page one of the memory. Data is received from the intramatrix bus 70 on a sixteen-bit data bus 194. The output of memories 186 and 190 are input to a bank select/demultiplexer circuit 196 through buses 198 and 200, respectively. Bank select/demultiplexer circuit 196 selects both the bank of memory from which data is to be output and also on one of the three subnodes 50a, 50b, and 50c to which the information is to be transmitted. The subnodes are interfaced with the bank select/demultiplexer circuit 196 through buses 202, 204 and 206. As described above, each of the buses 202 is a sixteen-bit data bus and provides 672 channels worth of information during any given frame.

Referring now to FIG. 7, there is illustrated a schematic block diagram of the memory block 190 for page one. As described above, each block of memory is comprised of four banks of data, one bank for each of the digital matrix modules 50–56 in the system. If additional digital matrix modules are utilized in the system, an additional bank of memory is utilized. Each bank of memory is comprised of two pages, one page of which is illustrated in FIG. 7. The four buses 194 that are interfaced with the intramatrix bus 70 are comprised of four individual sixteen-bit data buses 208, 210, 212 and 214, which buses are interfaced with data buses 72–78 of FIG. 5.

Data buses 208–214 are interfaced with data in latches 216, 218, 220 and 222, respectively. The outputs of latches 216–222 are input to page one data latches 224, 226, 228 and 230, respectively. In addition, data in latches 216–222 are also interfaced to page two latches (not shown) which are similar to the page one latches 224–230. The output of page one latches 224–230 are interfaced with intermediate data buses 232, 234, 236 and 238, respectively. Each of the data buses 232–238 is interfaced with the input a 32K RAM 240, 242, 244 and 246, respectively. Each of the 32K RAMs 240 is comprised of two 16K RAMs of the type 2018 manufactured by Toshiba Corp. for storing 2016 eight-bit words. One of the eight-bit RAMs is for storing the most significant bits and one for storing the least significant bits.

Data buses 232–238 are interfaced with the A-input of multiplexers 248, 250, 252 and 254, respectively. The remaining input of the multiplexers 248–254 is interfaced with each of the banks of page two memory block 186. The output of each of the multiplexers 248–254 is interfaced with bank select bus 256, which is a sixteen-bit data bus for receiving the output of one of the multiplexers 248–254. In addition, the multiplexers 248–254 select only from page one or page two and not from both. Therefore, information is selected from one of the RAM circuits 240–246 of page one if page one is the transmission page during the transmission frame. Bus 256 is interfaced with three data output latches 258, 260 and 262, the outputs of which are interfaced with buses 202, 204 and 206, respectively.

In operation, data is first input to the data input latches 216–222 which are comprised of D-type flip-flops. The information then is either transferred to the page one latches 224–230 or similar type latches in the page two memory block 186. These latches are also D-type flip-flop. This transfer of data occurs when the particular page is selected in the memory to receive the data in the collection frame. In the collection mode, data is then transferred from the latches 224–230 to data buses 232–238, respectively, in the page one memory block 190. The Write Enable inputs of RAMs 240–246 are controlled to store data and the page one address line 192 is interfaced with the output of the counter 162 such that data is stored sequentially in the various memory locations in RAMS 240–246, as described above. In the collection mode, buses 232–238 are unselected by multiplexers 248–254, respectively.

In the transmission mode, the latches 224–230 are inhibited from latching information onto buses 232–238, respectively. RAMs 240–246 are placed in the Read mode and the address bus 192 is interfaced with the output of control RAM 152 for random access to the various memories. Multiplexers 248–254 are then controlled to interface the selected bank with the bank select output bus 256. Multiplexers 248–254 are comprised of a two-to-one multiplexer for multiplexing two sixteen-bit data buses onto one sixteen-bit data bus and three-state output latches which are controlled by bank select inputs.

In summary, there has been provided a time slot interchange system which utilizes a distributed storage system with storage of information at a plurality of nodes in a system. Each of the storage nodes receives and stores all of the data transmitted to the system during a collection frame. On a transmission frame, each node is provided access to all of the information in the system with no interference from the transmission requirements of other nodes. During a collection frame, information is simultaneously stored in each of the nodes by dedicated pathways from each of the stored nodes to itself and each of the remaining nodes in the system. Therefore, the system is non-blocking and allows access to the information in accordance with a predetermined interconnection pattern stored at each of the nodes. The entire system is synchronized with an administrative subsystem.

Although the preferred embodiment has been described in detail, it should be understood that various changes, substitutions and alterations can be made therein without departing from the spirit and scope of the invention as defined by the appended claims.

What is claimed is:

1. A switch for interconnecting a plurality of digital call signals of a plurality of different communication call paths between a plurality of randomly selectable switch ports corresponding to the paths, comprising:

a plurality of nodes, one of said nodes associated with each of the switch ports;

receiving means associated with each of said nodes for receiving a single data value from each of the plurality of digital call signals from associated switch ports in a single collection time frame;

call storage means associated with each of said nodes for storing at each of said nodes all of the digital call signal data values received by said receiving means from all the nodes in the switch during said collection time frame;

pattern storage means associated with each of said nodes for storing associated interconnect patterns, each of said associated interconnect patterns for defining the call path between the switch port associated with the associated node and any of the other switch ports interfaced with the switch;

interconnect means for interconnecting each of said call storage means with each of said receiving means such that each of said call storage means simultaneously receives all of the digital call signal data values received by all of said receiving means in the switch; and access means associated with each of said nodes for accessing said stored digital call signal data values from said associated call storage means in accordance with said interconnect pattern in said associated pattern storage means in a single transmission time frame subsequent to said collection time frame.

2. The switch of claim 1 wherein each of said call storage means at each of said nodes comprises:
- a plurality of random storage means each having a plurality of storage locations for storing digital call signal data values received from only one of said nodes in the switch such that one of said random storage means is associated with each of said nodes in the switch;
- each of said random storage means operating in response to read addresses and a read signal to store received digital call signal data values from the associated one of said nodes during said collection time frame in accordance with a predetermined storage pattern;
- read means for generating said read addresses and said read signal, said read addresses selecting said storage locations in accordance with said predetermined storage pattern; and
- each of said random storage means operable to access said stored digital call signal data values under the control of said accessing means.

3. The switch of claim 2 wherein said predetermined storage pattern comprises a sequential storage pattern wherein said read means generates said read addresses in a sequential manner to sequentially store said digital call signal data values received by said receiving means associated with said random storage means in accordance with the order in which the digital call signals were received by said receiving means.

4. The switch of claim 2 wherein the number of said storage locations in each of said random storage measn is equal to the number of digital call signals received during a single collection time frame.

5. The switch of claim 2 wherein said access means comprises:
- multiplex means for selecting one of said random storage means for receiving stored digital call signal data values therefrom;
- random address means for generating write addresses and a write signal, said write addresses generated in accordance with said interconnect pattern associated with said access means during said transmission time frame;
- said random storage means operable to receive said write addresses and said write signal and access stored digital call signal data values in accordance with said write addresses for output therefrom; and
- interface means for interfacing the output of said multiplex means with the associated one of the switch ports during said transmission time frame.

6. The switch of claim 1 wherein said pattern storage means comprises a random access memory for interface with an external location for receiving said interconnect patterns therefrom.

7. The switch of claim 2 wherein each of said random storage means comprises a bank of random access memory, each bank of random access memory comprised of:
- a first random access memory having a plurality of storage locations for storing a first set of digital call signal data values during a first collection frame;
- a second random access memory having a plurality of storage locations for storing a second set of digital call signal data values during a second collection frame; and
- read/write select means for selecting said first memory for a read operation and said second memory for a write operation during said first collection frame and for selecting said first memory for a write operation and said second memory for a read operation during said second collection frame so that said single transmission frame for said first set of digital call signal data values occurs simulataneously with said second collection frame.

8. The switch of claim 1 wherein said digital call signals are received in a time domain multiplex format.

9. A time slot interchange switch matrix for interconnecting digital call signals between switch ports associated with the matrix, comprising:
- a plurality of storage nodes, each of said nodes associated with one of the switch ports and each having a switch port input and output for interfacing with the associated switch port, an intramatrix output, and a storage input;
- intramatrix bus means for interconnecting each of said intramatrix outputs on each of said nodes to said storage inputs on all said nodes;
- each of said nodes comprising:
  - receiving means for sequentially receiving digital call signal data values in a time domain multiplex format in a collection time frame, each of the digital call signal data values occupying a predetermined time slot in the time domain multiplex format, said receiving means interfaced with said associated intramatrix output;
  - a plurality of memory banks each having a plurality of storage locations and each associated with one of said nodes and having an output interfaced with said intramatrix bus for receiving digital call signal data values therefrom for storing in select ones of said storage locations, each of said memory banks operable to store digital call signal data values from two successive collection time frames;
  - read/write means for controllling each of said memory banks to store received digital call signal data values during said collection time frames in accordance with a predetermined storage pattern, and accessing stored digital call signal data values that were stored in a previous one of said collection time frames, said digital call signal data values stored during a single collection frame being accessed during a single transmission time frame in accordance with a predetermined interconnect pattern;
  - means for storing said predetermined interconnect pattern and said predetermined storage pattern; and
  - multiplex means for selecting the output of one of said memory banks in accordance with said predetermined interconnect pattern for output to the associated one of said switch ports in a time domain multiplex format during the transmission frame.

10. The time slot interchange switch matrix of claim 9 wherein said intramatrix bus means comprises a plurality of individual data buses, one each associated with each of said intramatrix outputs and the associated one of said memory banks and each of said nodes such that information received by said receiving means at each of said nodes can be transmitted along the associated one of said data buses to the associated one of said memory bank of each of said nodes whereby information received at each of said nodes at each of said receiving means is simultanously transmitted for storage in the associated one of said memory banks of each of said nodes.

11. The time slot interchange switch matrix of claim 9 wherein each of said memory banks comprises:
a first random access memory;
a second random access memory;
said first and second random memories each having a plurality of storage locations equal to the number of digital call signal data values received during a single collection frame in accordance with the time domain multiplex format;
the first and second memory means operable in response to said control signals from said read/write means to successively interchange between a read and a write operation such that in a first one of said collection time frames, one of said first and second random access memories is operated in a mode such that digital call signal data values are stored therein with the other of said first and second random memories having previously stored digital call signal data values read therefrom in a simultanous transmission time frame, and in a second and successive time frame, the one of said first and second random access memories having digital call signal data values stored therein during said first transmission time frame has digital call signal data values accessed therefrom during the successive collection time frame.

12. The time slot interchange switch matrix of claim 11 wherein said read/write means is operable to output a read address associated with a select storage location and a read signal to operate said first and second random access memories in a read mode to access stored digital call signal data values therefrom and to output a write address associated with a predetermined one of said storage locations and a write signal to operate said first and second random memories in a write mode to store received digital call signal data values in said storage locations, said read address and read signals and write address and write signals alternated between said first and second random access memories.

13. The time slot interchange switch matrix of claim 11 wherein said predetermined storage pattern comprises a sequential pattern of read addresses, said read/write means operable to generate sequential addresses in accordance with a sequential pattern to store received digital call signal data values from said receiving means in the order in which they were receiving during a given one of said collection time frames.

14. The time slot interchange switch matrix of laim 11 wherein said predetermined interconnect pattern comprises a random pattern for selecting storage locations in the one of said first and secod random access memories operating in the read mode, said random pattern predetermined and received from an external source to determined the interconnect pattern relative to the sequential pattern.

15. The time slot interchange switch matrix of claim 12 wherein said read/write means for controlling said first and second random access memories during the read operation and comprises a counter for generating a sequential string of read addresses.

16. The time slot interchange switch matrix of claim 9 wherein said predetermined storage pattern comprises a sequential pattern, said read/write means operable to control said memory banks to store received digital call signal data values in a sequential pattern in accordance with the order in which digital call signal data values are received from said receiving means and said predetermined interconnect pattern is a predetermined random pattern for defining the interconnection of call paths in relation to the sequential storing of the digital call signals in said memory banks.

17. The time slot interchange switch matrix of claim 9 wherein said predetermined storage pattern is common to all of said nodes such that received digital call signals at each of said nodes are stored in the same manner, said predetermined interconnect patterns unique with respect to each of said nodes.

18. A method for interconnecting digital call signals between a plurality of switch ports arranged in a matrix, comprising:
providing a plurality of storage nodes, each associated with one of the switch ports in the matrix;
sequentially receiving at each of the nodes digital call signal data values in a time domain multiplex format in a single collection time frame, each of said digital call signal data values occupying a predetermined time slot in the time domain multiplex format;
providing a plurality of memory banks at each of the nodes, one each of the memory banks at each of the nodes associated with one of the nodes in the matrix such that received digital call signal data values from each of the nodes can be stored in a separate one of the memory banks in each of the nodes;
storing a predetermined interconnect pattern;
storing a predetermined storage pattern;
receiving, at the associated one of the memory banks at each of the nodes, the received digital call signal data values, and storing the received digital call signal data values in accordance with the predetermined storage pattern during said single collection time frame; and
accessing, in accordance with the predetermined storage pattern, said digital call signal data values from one of the memory banks at each of the nodes during a single transmission time frame, said transmission time frame being an immediately subsequent time frame to said collection time frame.

* * * * *